(12) United States Patent
Nakata (10) Patent No.: US 8,369,364 B2
(45) Date of Patent: Feb. 5, 2013

(54) PATH MULTIPLEXING COMMUNICATION SYSTEM, COMMUNICATION NODE, AND COMMUNICATION METHOD

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 12/048,448

(22) Filed: Mar. 14, 2008

(65) Prior Publication Data

US 2008/0232390 A1    Sep. 25, 2008

(30) Foreign Application Priority Data

| Mar. 19, 2007 | (JP) | 2007-70562 |
| Feb. 15, 2008 | (JP) | 2008-34786 |
| Mar. 6, 2008 | (JP) | 2008-56263 |

(51) Int. Cl.
*H04J 3/04* (2006.01)

(52) U.S. Cl. ..................................... 370/536

(58) Field of Classification Search .................. 370/351, 370/229–235, 252–254, 236.2, 352
See application file for complete search history.

(56) References Cited

U.S. PATENT DOCUMENTS

| 5,095,480 | A | * | 3/1992 | Fenner | 370/238 |
| 5,942,989 | A | * | 8/1999 | Nagasawa et al. | 370/236 |
| 6,577,653 | B1 | * | 6/2003 | Rochberger et al. | 370/536 |
| 6,947,379 | B1 | * | 9/2005 | Gleichauf et al. | 370/229 |
| 7,123,586 | B1 | * | 10/2006 | Cook | 370/237 |
| 7,403,988 | B1 | * | 7/2008 | Blouin et al. | 709/223 |
| 7,606,156 | B2 | * | 10/2009 | DeLangis | 370/235 |
| 7,623,461 | B2 | * | 11/2009 | Vasseur et al. | 370/238 |

(Continued)

FOREIGN PATENT DOCUMENTS

| JP | 3160838 A | 7/1991 |
| JP | 9130388 A | 5/1997 |

(Continued)

OTHER PUBLICATIONS

Nakata et al., "Efficient bundling of heterogeneous radio resources for broadband Internet access from moving vehicles", Internet Systems Research Laboratory.

(Continued)

*Primary Examiner* — Andrew Lai
*Assistant Examiner* — Juvena Loo
(74) *Attorney, Agent, or Firm* — Sughrue Mion, PLLC (57) ABSTRACT

A communication system including first, second, and third nodes interconnected via interconnect links, a primary path composed of an interconnect link between the first node and the third node, and a secondary path composed of an interconnect link between the first and second nodes and an interconnect link between the second and third nodes, wherein
when the first node and the third node function as a transmitting node and a receiving node respectively, having a path multiplexing function to communicate with each other using bandwidths of a plurality of paths simultaneously, the first node transmits, to the second node, a path multiplexing request message for requesting communication with the third node,
and when receiving the path multiplexing request message, the second node functions as a relay node and determines whether the primary path and the secondary path can be logically multiplexed by providing, to the first node, the bandwidth of the interconnect link between the second and third nodes, and if path multiplexing is possible, the second node returns a path multiplexing acknowledgement message to the first node, and
the first node, in response to the path multiplexing acknowledgement message, multiplexes the primary and secondary paths to communicate with the third node.

28 Claims, 7 Drawing Sheets

U.S. PATENT DOCUMENTS

| | | | |
|---|---|---|---|
| 2001/0030945 A1* | 10/2001 | Soga | 370/238 |
| 2001/0046212 A1* | 11/2001 | Nakajima | 370/278 |
| 2002/0116715 A1* | 8/2002 | Apostolopoulos | 725/86 |
| 2002/0194367 A1* | 12/2002 | Nakamura et al. | 709/238 |
| 2003/0072269 A1* | 4/2003 | Teruhi et al. | 370/252 |
| 2005/0066036 A1* | 3/2005 | Gilmartin | 709/226 |
| 2007/0104115 A1* | 5/2007 | Decasper et al. | 370/254 |
| 2010/0138488 A1* | 6/2010 | Fletcher et al. | 709/203 |

FOREIGN PATENT DOCUMENTS

| | | |
|---|---|---|
| JP | 10243016 A | 9/1998 |
| JP | 2000216817 A | 8/2000 |
| JP | 2001320420 | 11/2001 |

OTHER PUBLICATIONS

Dovrolis et al., "What do packet dispersion techniques measure", IEEE INFOCOM, 2001, pp. 905-914.

Katevenis et al., "Weighted Round-Robin Cell Multiplexing in a General-Purpose ATM Switch Chip"., IEEE Journal on Selected Areas in Communications, vol. 9, No. 8, Oct. 1991, pp. 1265-1279.

Traw et al., "Striping Within the Network Subsystem", IEEE Network, Jul./Aug. 1995, pp. 22-32.

Communication dated Apr. 10, 2012 from the Japanese Patent Office in counterpart Japanese application No. 2008-056263.

* cited by examiner

NODE TABLE 6

| NODE ID | NETWORK ADDRESS | METRIC |
|---|---|---|
| aaa | 10.0.1.22 | 2 |
| bbb | 10.0.1.5 | 2 |
| ccc | 10.0.1.13 | 1 |
| ddd | 10.0.1.38 | 3 |

FIG. 8
RELATED ART

PATH MULTIPLEXING COMMUNICATION SYSTEM, COMMUNICATION NODE, AND COMMUNICATION METHOD

This application is based upon and claims the benefit of priority from Japanese patent application No. 2007-070562, filed on Mar. 19, 2007, Japanese patent application No. 2008-034786, filed on Feb. 15, 2008 and Japanese patent application No. 2008-056263, filed on Mar. 6, 2008, the disclosure of which is incorporated herein in its entirety by reference.

BACKGROUND OF THE INVENTION

1. Field of the Invention

The present invention relates to a path multiplexing communication system, a communication node, and a communication method.

2. Description of the Related Art

When there are two or more paths available between two communication nodes, higher speed communication, compared to the case using single path, is possible since the bands of plural paths are multiplexed by load distribution of the traffic between both nodes among these paths. As techniques for multiplexing the bands of plural paths in a stable wired network, a round-robin system disclosed in Non-Patent Document 1 and a weighted round-robin system disclosed in Non-Patent Document 2 are known. A round-robin system is a technique to input data to each of paths in sequence, and a weighted round-robin system is a technique to decide the weight of load distribution depending on the difference of communication speeds among the plural paths. Further, as a technique for multiplexing the bands of plural paths including a more unstable wireless link, a Mobile Inverse Mux disclosed in Non-Patent Document 3 is known.

Figure 8:
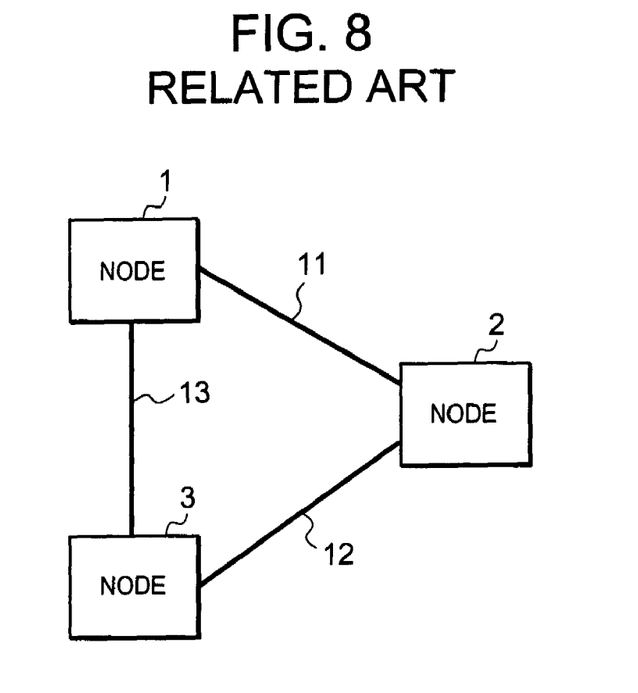
FIG. 8 is a block diagram for explaining the related art.

In these path multiplexing techniques, suppose that there is a node having path multiplexing function on a path to be multiplexed by other two nodes. In FIG. 8, nodes 1, 2, and 3 all have a path multiplexing function. In this case, if the node 1 communicates with the node 3, there is a path consisting of only link 13, which make it possible to communicate directly with each other. On the other hand, they can communicate with each other via a path consisting of link 11, node 2 and link 12. Multiplexing of these two path can be realized by configuring the node 2 to function as a mere relay node for the traffic between the nodes 1 and 3. Similarly, by configuring the node 1 to function as a mere relay node for the traffic between the nodes 2 and 3, the two paths between the nodes 2 and 3 are multiplexed. Thus, if there is a node having a path multiplexing function on a path to be multiplexed, by configuring each node to act according to the traffic, it is possible to share part of the paths to be multiplexed among different nodes, and hence to improve the efficiency of utilization of network resources.

[Non-Patent Document 1] "Striping Within the Network Subsystem," IEEE Network, July/August 1995.

[Non-Patent Document 2] M. Katevenis, S. Sidiropoulos, C. Courcoubetis, "Weighted Round-robin Cell Multiplexing in a General-Purpose ATM Switch Chip," IEEE Journal on Selected Areas in Communications, Vol. 9, Issue 8, pp. 1265-1279 (October 1991).

[Non-Patent Document 3] T. Nakata et al., "Efficient Bundling of Heterogeneous Radio Resources for Broadband Internet Access from Moving Vehicles," Proceedings of Global Mobile Congress 2004, Oct. 11-13 2004, Shanghai, China.

[Non-Patent Document 4] Dovrolis, Ramanathan, and Moore, "What Do Packet Dispersion Techniques Measure?" IEEE INFOCOM 2001.

[Patent Document 1] Japanese Patent Application Laid-Open No. 2001-320420.

Suppose that traffic is given to both the node 1 and the node 2 to be transmitted to the node 3 at an instant. If both nodes transmit traffic to the node 3 using plural paths, they need to have a path multiplexing function in addition to a relay function. For the sake of simplicity, it is assumed that the link 11 has a wider band than the other links. For example, if the node 1 communicates with the node 3 via the node 2, the link 12 is a bottleneck on the path. Here, if a fixed weighting information is given to node 1 as shown in Non-Patent Document 2 or load distribution is performed by node 1 based on the bandwidth estimation result as shown in Non-Patent Document 3, each according to the bandwidth of the link 12 and the link 13 which can form a path for direct communication, since traffic between the nodes 2 and 3 also exists on the link 12, an actually available bandwidth of the link 12 for communication between node 1 and node 3 is narrower than the case where there is no such traffic sharing link 12.

Since Non-Patent Document 2 and Non-Patent Document 3 do not consider the existence of traffic among nodes as mentioned above, they cannot perform optimum load distribution. In general, as shown in Non-Patent Document 4, it is difficult to estimate an available bandwidth by the method using packet dispersion, disclosed in Non-Patent Document 3, if traffic exists in a section other than the section between endpoints to be measured, which is called 'cross traffic', when the bandwidth of a path is estimated only at the endpoint of one path.

The above-mentioned problem does not arise if each traffic rate is low enough not to cause congestion in each of the links, when the nodes 1 and 2 perform load distribution to both the links 13 and 12. Since the traffic between the node 1 and 3 and the traffic between the nodes 2 and 3 are both low rates, the deficiency of bandwidth does not occur even without load distribution to the plurality of paths. However, the bandwidth of the link 11, included only in the paths which use node 1 or 2 as a relay node, is consumed although the bandwidth is unnecessary for the purposes of bandwidth supply between the nodes 1 and 3 and bandwidth supply between the nodes 2 and 3.

On the other hand, Patent Document 1 discloses other technique for load distribution, which is realized by calculating load based on collected traffic characteristics information and by determining whether a transmission path should be added or deleted based on the calculated load.

However, by the technique disclosed in Patent Document 1, the amount of communication data among each of nodes becomes large since traffic characteristics information themselves are transmitted/received among each of nodes for collecting information. Here, for example, parameters like queue length and the number of flows can be such traffic characteristics. However, if these variables are transmitted/received among all of the nodes, the amount of data can become enormous as the number of nodes increases. Flexibility in determining whether a transmission path should be added or deleted also can be a problem. Further, if information on other than traffic, such as, for example, the reliability of the path, the possibility of a cyberattack, or the degree of battery drain (if it is a mobile node) should be considered as a criterion, not only does the protocol become complicated, but also does the amount of communication increase according to the number of criteria by the technique described in Patent Document 1 since communication among each of nodes has to be defined corresponding to all the criteria. Further, as the technique described in Patent Document 1 requires that each node collects and transmits only the status and all of the determination are conducted by a transmitting node, there is a problem that calculation load for determination is concentrated on the transmitting node.

SUMMARY

An exemplary object of the invention is to provide a path multiplexing communication system, a communication node, and a communication method for solving the above-mentioned problems.

An exemplary aspect of the invention, there is provided a communication system comprising first, second, and third nodes interconnected via interconnect links, a primary path composed of an interconnect link between the first node and the third node, and a secondary path composed of an interconnect link between the first and second nodes and an interconnect link between the second and third nodes, wherein when the first node and the third node function as a transmitting node and a receiving node respectively, having a path multiplexing function to communicate with each other using bandwidths of a plurality of paths simultaneously, the first node transmits, to the second node, a path multiplexing request message for requesting communication with the third node, and when receiving the path multiplexing request message, the second node functions as a relay node and determines whether the primary path and the secondary path can be logically multiplexed by providing, to the first node, the bandwidth of the interconnect link between the second and third nodes, and if path multiplexing is possible, the second node returns a path multiplexing acknowledgement message to the first node, and the first node, in response to the path multiplexing acknowledgement message, multiplexes the primary and secondary paths to communicate with the third node.

In another exemplary aspect of the invention, there is provided a communication system comprising: a communication network; a plurality of relay nodes connected to the communication network; at least one transmitting node connectable to at least one of the plurality of relay nodes via the communication network; and a receiving node connected to the plurality of relay nodes, wherein at least one of primary paths and at least one of secondary paths, together involving the network and the plurality of relay nodes, are configured between the transmitting node and the receiving node, at least one node in the plurality of relay nodes functions as a transmitting side relay node upon communication between the transmitting node and the receiving node and transmits the path multiplexing request message, when receiving the path multiplexing request message via the network, at least one other node in the plurality of relay nodes functions as a receiving side relay node, it determines whether at least one primary path and at least one secondary path can be logically multiplexed by providing, to the transmitting node, a bandwidth of a link between the receiving side relay node and the receiving node, and if path multiplexing is possible, a path multiplexing acknowledgement message is returned to the transmitting side relay node via the network, the transmitting side relay node, in response to the path multiplexing acknowledgement message, relays communication between the transmitting node and the receiving node using both of at least one of the primary paths and at least the one secondary path.

In still another exemplary aspect of the invention, there is provided a communication node functioning as any of a transmitting node, a relay node, and a receiving node in a communication network configured of a primary path composed of an interconnect link between the transmitting node and the receiving node, and a secondary path composed of an interconnect link from the transmitting node to the receiving node via the relay node, comprising: a transmitting/receiving unit which performs transmission and reception, when the communication node functions as a relay node, which is connected to other node functioning as transmitting node and to the other node functioning as receiving node; a controller which determines whether the primary path and the secondary path can be logically multiplexed by providing, to the node functioning as transmitting node, a bandwidth of an interconnect link between the communication nodes and the other nodes functioning as receiving node, when receiving a path multiplexing request message from the node functioning as transmitting node via the transmitting/receiving unit; message generating unit which returns a path multiplexing acknowledgement message to the node functioning as transmitting node via the transmitting/receiving unit when path multiplexing is possible as a result of determination by the controller; and path multiplexing unit, controlled by the controller, which transmits traffic from the node functioning as transmitting node over the secondary path.

In still another exemplary aspect of the invention, there is provided a communication method in a communication network configured of a primary path from a transmitting node to a receiving node, and a secondary path from transmitting node to the receiving node via a relay node, the method comprising: (a) a step of transmitting a path multiplexing request message from the transmitting node to the relay node; (b) a step of determining whether the primary path and the secondary path can be logically multiplexed by providing, from the relay node to the transmitting node, a bandwidth of an interconnect link between the relay node and the receiving node; (c) a step of returning a path multiplexing acknowledgement message to the transmitting node when path multiplexing is possible as a result of the determination; and (d) a step of multiplexing the primary path and the secondary path in response to the path multiplexing acknowledgement message.

EXEMPLARY EMBODIMENT

Figure 1:
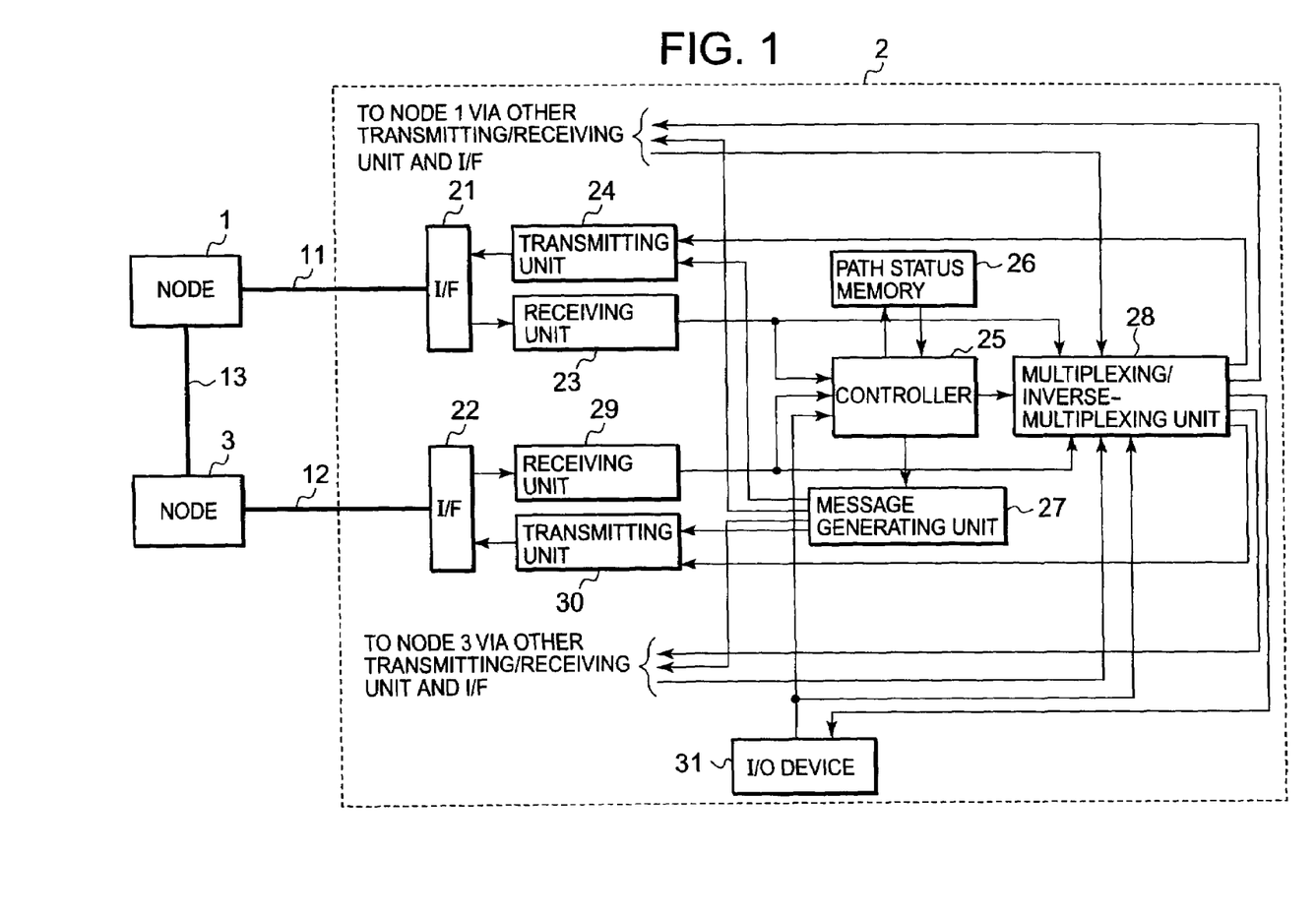
FIG. 1 is a block diagram showing a communication system according to a first exemplary embodiment.

FIG. 1 shows a communication system of a first exemplary embodiment. The communication system is configured of at least three nodes 1, 2, and 3, and interconnected by interconnect links 11, 12, and 13. Among the nodes 1, 2, and 3, at least one node functions as a relay node having a path multiplexing function. And, at least one of the other two nodes, when it functions as a transmitting node, transmits a multiplexing request message indicating the communication band with the receiving node to a relay node on a path including a plurality of links excluding the interconnect link that directly connects the transmitting node and the receiving node, to the receiving node. The relay node receiving this path multiplexing request message determines whether the band indicated in this message can be logically multiplexed onto the interconnect link to the receiving node. And, if multiplexing is possible, a path multiplexing acknowledgement message including path information is returned to the transmitting node. Otherwise, a multiplexing rejection message is returned. When receiving the path multiplexing acknowledgement message, the transmitting node communicates with the receiving node via the relay node. Further, the transmitting node is provided with inverse-multiplexing unit for load distribution.

For example, the node 1 may include multiplexing unit to function as a relay node, and the node 2 may include an inverse-multiplexing unit to function as a transmitting node. In this case, if the node 2 communicates with the node 3, the node 2 transmits the multiplexing request message to the node 1.

The node 2 having the relay function includes interfaces 21, 22 such as a modem, and is connected to the node 1 and 3 through links 11 and 12 respectively. The interface 21 supplies a signal from the node 1 to a receiving unit 23 for protocol processing and transmits a signal from a transmitting unit 24 for protocol processing of the transmission signal to the node 1. Similarly, the interface 22 supplies a signal from the node 3 to a receiving unit 29, and transmits a signal from a transmitting unit 30 to the node 3.

The output of the receiving units 23, 29 and the output of an I/O device 31 are supplied to a controller 25 and a multiplexing/inverse-multiplexing unit 28. And, the controller 25 inputs, to the multiplexing/inverse-multiplexing unit 28, a control signal to instruct a load distribution ratio, parameter changes of an algorithm deciding transmission timing and so on if they are required. The output of the multiplexing/inverse-multiplexing unit 28 is connected to the transmitting units 24, 30 and the I/O device 31. The relay node has a path other than the path composed of the links 11 and 12, and the multiplexing/inverse-multiplexing unit 28 is connected to the nodes 1 and 3 via other transmitting/receiving units and interfaces. The multiplexing/inverse-multiplexing unit 28 has a function for multiplexing these plural paths possessed by the relay node.

A path status memory 26 for storing path status information is connected to the controller 25, and the controller 25 always monitors traffic input to the node 2 and output from the node 2, and updates the memory 26.

If the node 1 performs load distribution of traffic to the node 3, the node 1 transmits a path multiplexing request message to the node 2 in advance. The receiving unit 23 of the node 2 receives this message and sends it to the controller 25. As will be described later, the controller 25 reads out status information on multiplexed links obtained by multiplexing a plurality of paths between the node 2 and the node 3 not including the node 1, from path status memory 26. Then, the controller 25 determines whether the path between the node 1 and the node 3 including this multiplexed link and other paths between node 1 and the node 3 can be multiplexed, and supplies the result to a message generating unit 27. If multiplexing is possible based on the determination result of the controller, the message generating unit 27 returns a path multiplexing acknowledgement message to the node 1 through the transmitting unit 24. Otherwise, the message generating unit 27 returns a multiplexing rejection message.

If the multiplexing rejection message is returned from the node 2, the node 1 stops the load distribution. Or, if path multiplexing acknowledgement message is returned, the node 1 transmits part of transmitted traffic (encapsulated data) for the node 3 directly to the node 3 and the remaining traffic for the node 3 to the node 2.

When receiving the encapsulated data from the node 1, the controller 25 of the relay node 2 outputs this data to the multiplexing/inverse-multiplexing unit 28 in order to transfer it to the node 3 through the multiplexed link. The multiplexing/inverse-multiplexing unit 28 selects any one of the plurality of paths between the node 2 and the node 3, which does not go through the node 1, to output the encapsulated data from the receiving unit 23 to a corresponding transmitting unit. The transmitting unit 30 transmits the data signal input from the multiplexing/inverse-multiplexing unit 28 to the receiving node 3 through the interface 22 and the link 12.

According to the multiplexing method of Non-Patent Document 3, the relay node not only performs load distribution on the traffic received from the transmitting node, but also returns the received data to the transmitting node. This results in inefficient bandwidth consumption and delay.

To prevent this, according to the embodiment, the transmitting node 1 performs encapsulation processing on transmitted data to be able to identify a node whose receiving side is the source of load distribution. Thus, the relay node 2 identifies the node 1 as the source of transmission from the encapsulated received data, and transmits this received data to the receiving node 3 through a multiplexed link configured by a path which do not go through the node 1.

When receiving the encapsulated data between the transmitting node 1 and the receiving node 3, the controller 25 of the relay node 2 reads out path status information of the multiplexed link from the memory 26. Then, if the controller 25 determines that subsequent data cannot be transferred using the multiplexed link, it outputs the current received data to the multiplexing unit 28 and returns the multiplexing rejection message to the node 1. On the other hand, if the controller 25 determines that subsequent data can be transferred using the multiplexed link, based on the path status information of the multiplexed link obtained from the memory 26, the multiplexing unit 28 transmits the current received data using any one of paths which do not go through the node 1.

When receiving the encapsulated data between the transmitting node 1 and the receiving node 3, the controller 25 of the relay node 2 reads out path status information of the link 12 from the memory 26. Then, if the controller 25 determines that subsequent data cannot be multiplexed onto the link 12, it multiplexes the current received data by the multiplexing unit 28 and returns multiplexing rejection message to the node 1. On the other hand, if the controller 25 determines that subsequent data can be multiplexed onto the link 12, based on the path status information of the link 12 obtained from the memory 26, the multiplexing unit 28 multiplexes the current received data onto the link 12.

Figure 2:
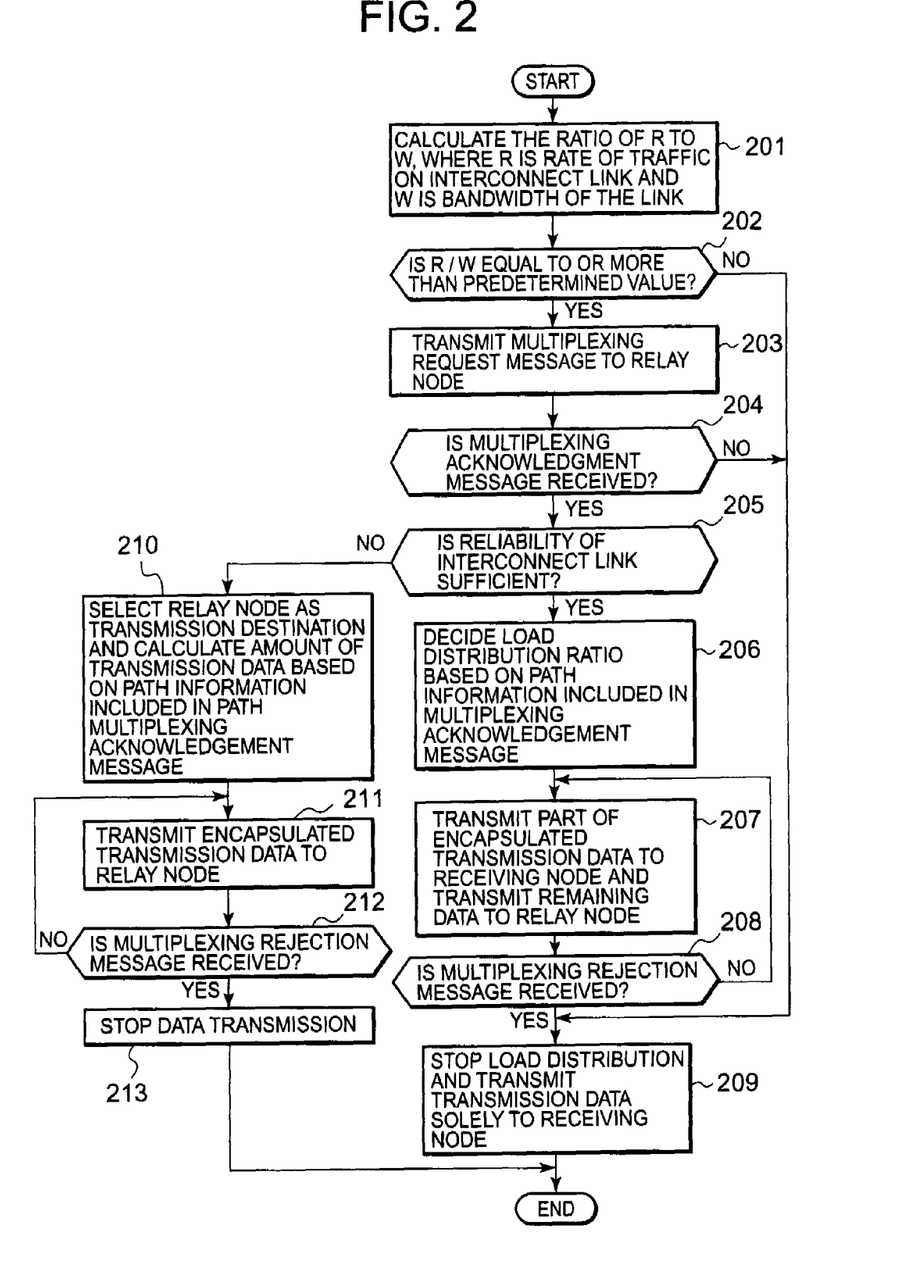
FIG. 2 is a flowchart showing the operation of a transmitting node in FIG. 1.

FIG. 2 is a flowchart showing an example of the operation of the transmitting node for performing load distribution. First, in step 201, the transmitting node detects rate of traffic (R) on interconnect link with the receiving node to calculate the ratio of R TO W (R/W), where R is rate of traffic on interconnect link and W is bandwidth of the link. Then, it determines whether the value (R/W) is equal to or more than a predetermined value (step 202). If it is less than the predetermined value, the control proceeds to step 209 in which multiplexing via the relay node is stopped and the transmission data is transmitted directly to the receiving node. This makes it possible to prevent the bandwidth of a relay link from unnecessarily consumed.

If the occupancy (R/W) is equal to or more than the predetermined value, the transmitting node, proceeding from step 202 to step 203, transmits a path multiplexing request message to the relay node. When receiving a message from the relay node, the transmitting node determines whether the message is a path multiplexing acknowledgement message or a path multiplexing rejection message (step 204). And, if it is the rejection message, the control proceeds to step 209 in which multiplexing via the relay node is stopped. If the received message from the relay node is the acknowledgement message, the transmitting node, proceeding from step 204 to step 205, verifies the reliability of the interconnect link. One example of factors to verify the reliability of the interconnect link is data loss rate of the link. Further, if the transmitting node is a mobile terminal, the reliability of the link may be determined from the value of probability that the terminal moves out of a communication area in a predetermined period of time.

In this case, for the reason described in Non-Patent Document 4, a higher accuracy of measurement can be realized, compared to the case where the source node of the multiplexing request directly measures. The transmitting node, as the source of multiplexing request, can reduce processing load, since the transmitting node itself does not need to estimate the status of a path relayed by the relay node as the request destination.

If the reliability of the interconnect link is sufficient, the transmitting node, proceeding from step 205 to step 206, decides load distribution ratio based on the path information included in the path multiplexing acknowledgement message. Then, it proceeds to step 207, in which part of encapsulated transmission data is transmitted to the receiving node and the remaining data is transmitted to the relay node. After transmission, it is determined in determination step 208 whether a multiplexing rejection message is received from the relay node. If the multiplexing rejection message does not come from the relay node, the control returns to step 207 in which the next data is transmitted in the load distribution mode. If the multiplexing rejection message comes from the relay node after the data transmission, the transmitting node proceeds to step 209 in which the load distribution communication mode is immediately stopped and the transmission data is transmitted directly to the receiving node.

On the other hand, if the reliability of the interconnect link is insufficient, the transmitting node proceeds from step 205 to step 210 in which the relay node is selected as the transmission destination and amount of transmission data is calculated based on the path information included in the path multiplexing acknowledgement message.

Next, in step 211, encapsulated transmission data is transmitted to the relay node. After transmission, it is determined in determination step 212 whether the multiplexing rejection message is received from the relay node or not. If the multiplexing rejection message does not come from the relay node, the control returns to step 211 in which the next data is transmitted to the relay node. If the multiplexing rejection message comes from the relay node after transmission, the transmitting node, proceeding to step 213, immediately stops data transmission toward the relay node.

Figure 3:
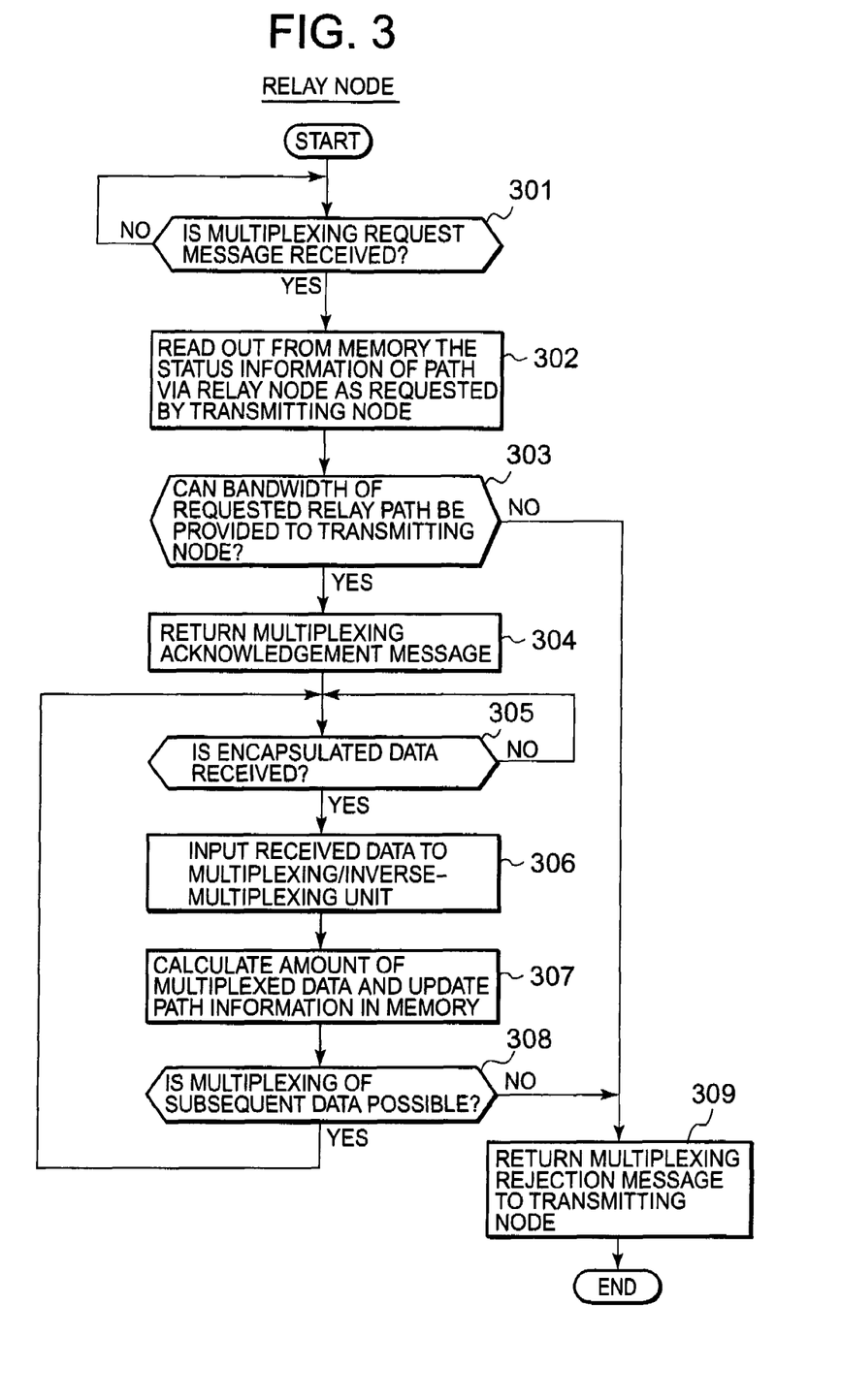
FIG. 3 is a flowchart showing the operation of a relay node in FIG. 1.

FIG. 3 is a flowchart showing an example of the operation of the relay node. First, in determination step 301, it is determined whether the path multiplexing request message is received from the transmitting node. When receiving the path multiplexing request message from the transmitting node, the relay node reads out, from the path status memory 26, the in-use bandwidth of the path via the relay node requested by the transmitting node and an available bandwidth of this path as path status information (step 302).

Next, a rate of utilization of the in-use bandwidth via the relay node to the available bandwidth of the path is calculated based on the information read out from the memory 26. Then, in step 303, the calculated rate of utilization is compared with a predetermined multiplexing determination reference value to determine whether the bandwidth of the requested path can be provided to the transmitting node in order to decide the possibility of path multiplexing. In other words, when the node 1 is the transmitting node and the node 3 is the receiving node, the node 2 functions as the relay node. And, the relay node determines whether a primary path composed of the interconnect link 13 between the nodes 1 and 3 and a secondary path composed of the links 11 and 12 via the relay node are logically multiplexed by providing the bandwidth of the interconnect link 13 between the relay node 2 and the receiving node 3. If it is determined that path multiplexing is impossible, the relay node, proceeding to step 309, returns the path multiplexing rejection message to the transmitting node.

On the other hand, if the relay node determines that path multiplexing is possible in step 303, it returns the path multiplexing acknowledgement message to the transmitting node in the next step 304. As an example, an upper limit value of the bandwidth capable of being provided on the relay path or predicted delay information may be included as the path status information in the path multiplexing acknowledgement message that the relay node returns to the transmitting node. Further, the relay node may generate the path status information based on a content or a data amount of traffic dealt with at the time of receiving the path multiplexing request message, and include the generated path status information in the path multiplexing acknowledgement message. Furthermore, the relay node may include information indicating whether the traffic dealt with is multicast traffic in the path status information.

Next, the relay node, proceeding to step 305, waits until the encapsulated data comes from the transmitting node. When receiving the encapsulated data in step 305, the relay node, proceeding to step 306, inputs the received data to the multiplexing/inverse-multiplexing unit 28.

In step 307, the relay node calculates the amount of data multiplexed onto the relay path, and based on this, updates the path status memory 26. Next, in step 308, the possibility of path multiplexing of subsequent data is verified. And if path multiplexing is possible, the relay node, returning to step 305, waits until the subsequent data comes from the transmitting node and this processing is repeated.

As a result of the determination in step 308, if path multiplexing of the subsequent data is impossible, the relay node, proceeding to step 309, returns the path multiplexing rejection message to the transmitting node.

Figure 4:
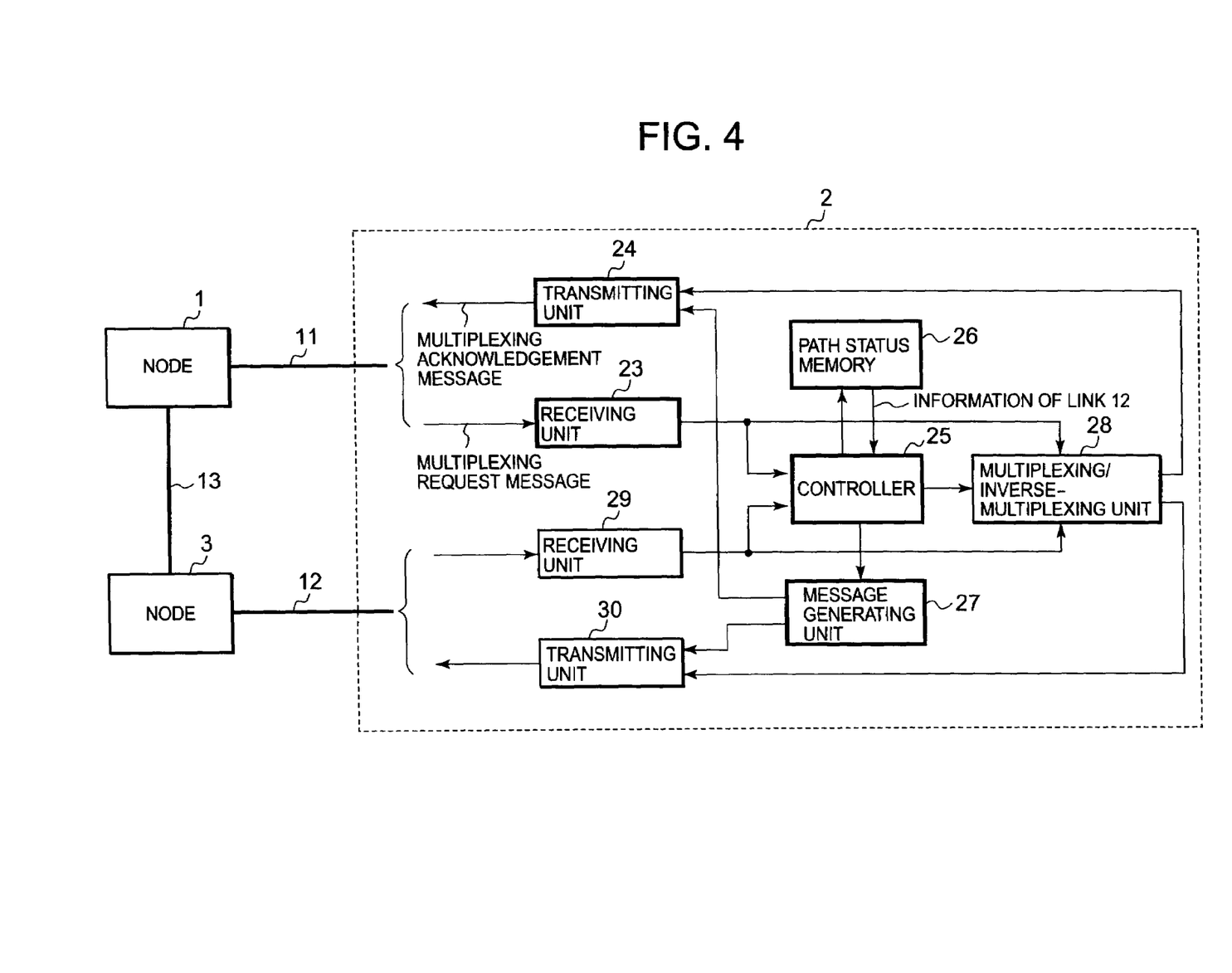
FIG. 4 is a block diagram showing exchange of a multiplexing request message and a path multiplexing acknowledgement message among the nodes in FIG. 1.

Thus, if the path multiplexing request message, in which the node 1 functions as the transmitting node and the node 3 is the receiving node, is sent to the node 2, the node 2 as the relay node receives this message by the receiving unit 23 as shown in FIG. 4. Next, the controller 25 of the node 2 analyzes this message and, simultaneously, reads out status information of the link 12 from the path status memory 26. Then, the node 2 determines whether the path requested by the node 1 can be multiplexed. And, if it is possible, the path multiplexing acknowledgement message is returned from the message generating unit 27 to the transmitting node 1 through the transmitting unit 24.

Figure 5:
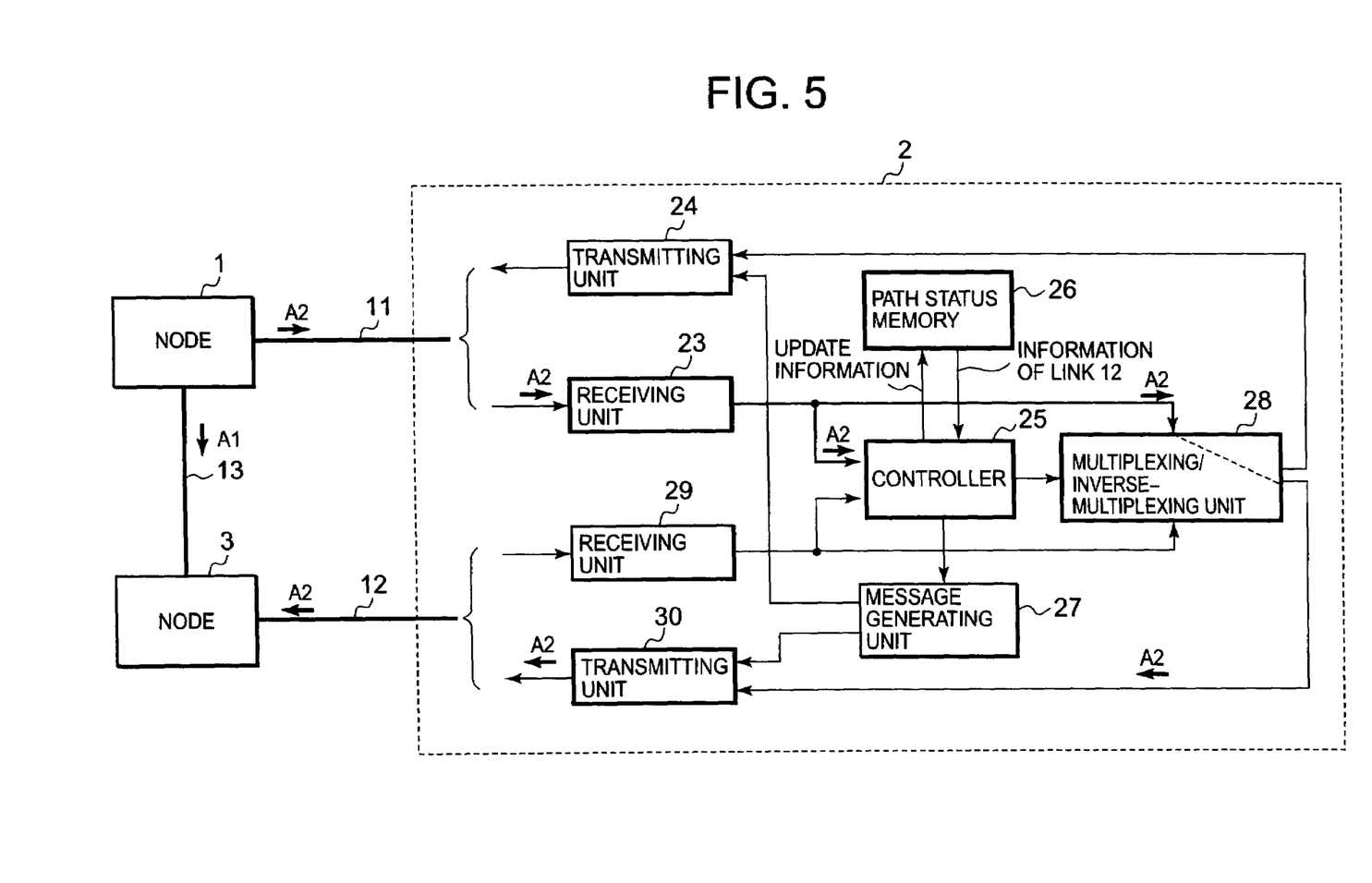
FIG. 5 is a block diagram showing such a state that the relay node in FIG. 1 receives encapsulated data from the transmitting node.

In response to this path multiplexing acknowledgement message, the transmitting node 1 starts communication in the load distribution mode and inverse-multiplexes all transmission data into A1 and A2 as shown in FIG. 5. Then, the transmitting node 1 transmits data A1 to the receiving node through the link 13 and data A2 to the relay node through the link 11.

When receiving data A2, the controller 25 of the relay node 2 reads out updated status information of the link 12 from the path status memory 26. Then, the controller 25 determines the possibility of multiplexing of subsequent data. And, if multiplexing is possible, the controller 25 controls the multiplexing/inverse-multiplexing unit 28 to send the received data A2 to the transmitting unit 30 and multiplex it onto the link 12. If multiplexing of subsequent data is impossible, the current data is sent to the transmitting unit 30 through the multiplexing/inverse-multiplexing unit 28 while sending the multiplexing rejection message from the message generating unit 27 to the transmitting node 1 through the transmitting unit 24.

As is apparent from the above description, according to the exemplary embodiment, since the path multiplexing acknowledgement message or the path multiplexing rejection message, i.e. a message whether the path can be multiplexed or not (Yes or No message), is transmitted from the relay node to the transmitting node, amount of communication data among nodes is enormously small. Thus, the embodiment can be applied to a large system including a large number of nodes.

Further, according to the exemplary embodiment, since the relay node determines whether path multiplexing is possible or not, and based on this determination, the path multiplexing acknowledgement message or the path multiplexing rejection message is transmitted from the relay node to the transmitting node, there is flexibility in determining the path multiplexing. In other words, for example, if the reliability of the path, the possibility of a cyberattack, or battery wear (in case of a mobile node), etc. is to be a criterion to determine whether to perform path multiplexing, since the relay node has only to be matched with these criteria, no change in communication among nodes is necessary.

Further, according to the exemplary embodiment, since the determination is made by the relay node, the problem in Patent Document 1 that calculation load used in the determination is concentrated on the transmitting node is solved.

In the above-mentioned embodiment, although the controller 25 always monitors traffic input to the node 2 and output from the node 2, it is not limited to this. For example, the controller 25 may start monitoring of the traffic only when a multiplexing request is received from the transmitting node. Further reduction of the burden of the relay node can be possible by this.

Figure 6:
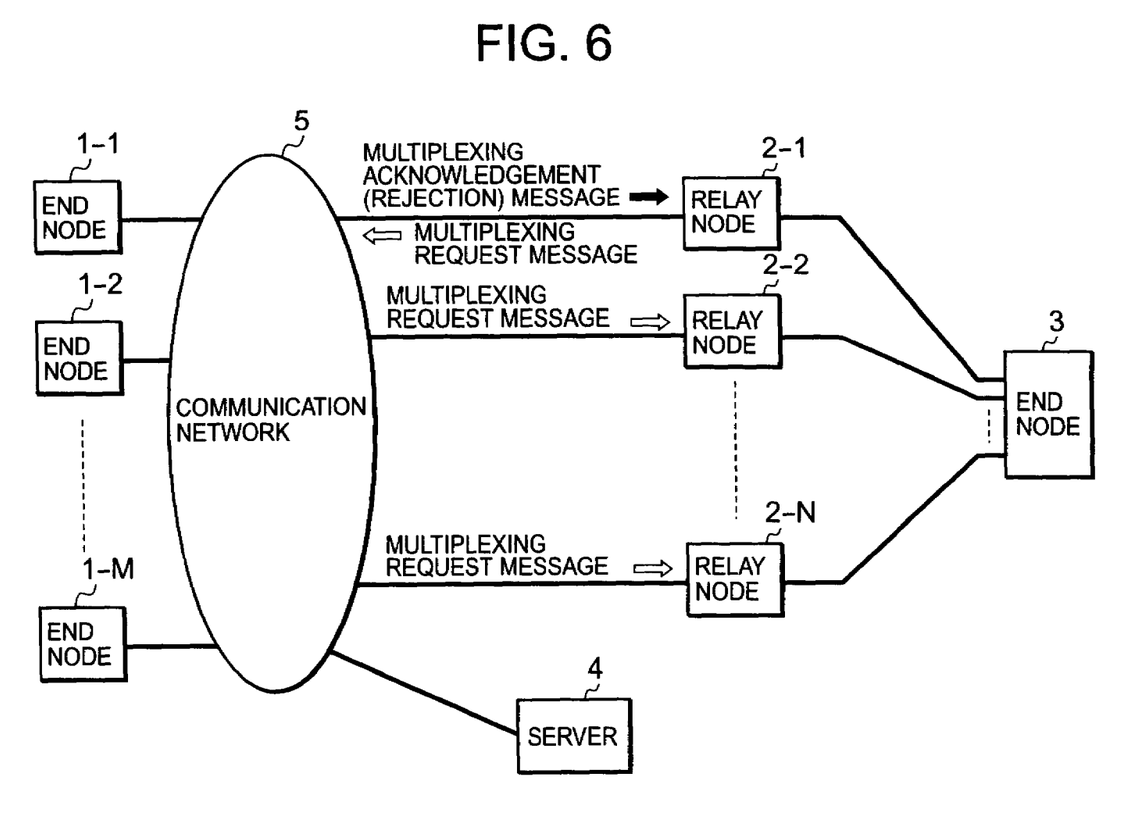
FIG. 6 is a block diagram showing a communication system according to a second exemplary embodiment.

FIG. 6 shows a communication system according to a second exemplary embodiment. As shown, nodes 2-1 to 2-N are relay nodes having both of a relay function and the path multiplexing function, nodes 3 are end nodes having the path multiplexing function and nodes 1-1 to 1-M are end nodes that do not have the path multiplexing function. All the relay nodes 2 and all the end nodes 1 are interconnected through a communication network 5.

Here, when the relay node 2 receives traffic generated by itself, or traffic of the end node 3, or traffic transmitted from an end node 1 to any destination not connected to network 5, if transmittable, the path multiplexing request message is broadcast to all the relay node 2 via the communication network 5, or transmitted to at least one of relay nodes 2 identified by a method to be described below, for example.

Figure 7:
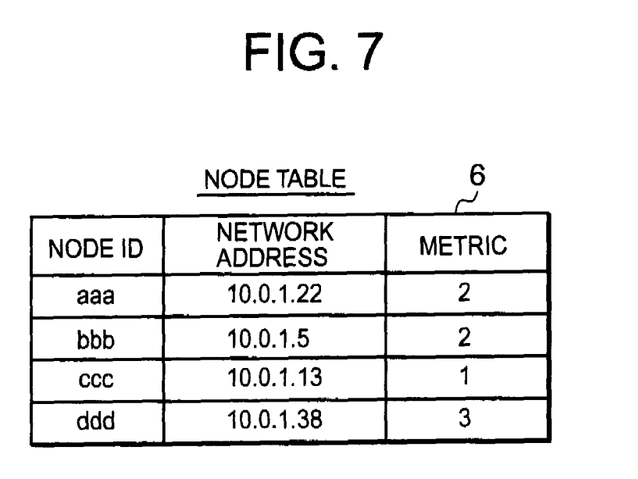
FIG. 7 is a node table used in the communication system in FIG. 6.

Nodes capable of requesting multiplexing are pre-registered in a node table 6 as candidates of transmission destination of the path multiplexing request message, for example, as shown in FIG. 7, and stored in a memory 26 of FIG. 1. In FIG. 7, 'metric' represents priority of the nodes as the objects of multiplexing and this is decided according to, for example, the hop count in the communication network 5. If the number of nodes to be multiplexed is limited, a specific number of nodes are selected from the smallest metric value as the objects of multiplexing. If a node having the path multiplexing function is dynamically connected to or disconnected from the communication network 5 and topology is dynamically changed, the node whose state is changed sends notification throughout the communication network 5. And the other relay nodes that receive the notification update the node table of the nodes to be multiplexed. The node table of the nodes to be multiplexed can be stored in a server 4 of FIG. 6 so that the server 4 can respond to inquiries from other relay nodes about a node capable of multiplexing. As an example, an ASP (Application Service Provider) server may be used as the server 4. Thus, by limiting the number of destination nodes of the transmission of the path multiplexing request message, it is realized to restrict the stress on bandwidth in the network 5 with the path multiplexing request message and the multiplex acknowledgement (rejection) message.

At least one of the relay nodes functions as a transmitting side relay node upon communication from one of the end nodes 1 to the end node 3 to transmit the path multiplexing request message to the network 5. When receiving the path multiplexing request message, at least one of the relay nodes 2 that has received the path multiplexing request message functions as a receiving side relay node. At least one primary path and at least one secondary path are configured between the transmitting side relay node and the end node 3, where a primary path does not include any relay node other than the transmitting side relay node and a secondary path includes the receiving side relay node and the network 5. And, the node 2, functioning as receiving side relay node, determines whether the primary path and the secondary path can be logically multiplexed by, as described with reference to FIG. 3, providing the bandwidth of an interconnect link between the receiving side relay node 2 and the receiving node 3 to the transmitting side relay node 2. If path multiplexing is possible, the path multiplexing acknowledgement message is returned to the transmitting side relay node via the network 5. In response to this path multiplexing acknowledgement message, the transmitting side relay node performs load distribution and relays the traffic between transmitting node 1 and the end node 3 via the primary path and the secondary path.

According to the exemplary embodiments, performance degradation and unnecessary consumption of bandwidth resources can be prevented, in a communication system including a plurality of nodes having a path multiplexing function, where a node having a path multiplexing function is included in a path, in which other node having path multiplexing function is a source or a relay point of transmission and each of nodes, having the path multiplexing function, functions as a transmitting or a relay node. This is because the consumption of bandwidth between nodes having a path multiplexing function is suppressed by limiting the number of destinations of the path multiplexing request.

Further, according to the exemplary embodiments, since a path multiplexing request message and a path multiplexing acknowledgement/rejection message are introduced in a communication system including at least one node having path multiplexing function, the load distribution by the transmitting side node can be optimized. In other words, the relay node having the path multiplexing function, in response to the path multiplexing request message from other node having the multiplexing function, decides whether multiplexing is possible and returns the path multiplexing acknowledgement/rejection message to the node who transmitted the multiplexing request. Thus, even when one of the paths, which are to be multiplexed by the transmitting side node includes a relay node and a traffic exists between the transmitting side node and a destination node sharing the same relay nodes with the transmitting side node, the transmitting side node can efficiently multiplex the bandwidth of a path including a relay node and the bandwidth of other path not including the relay node based on the decision of the relay node that accepted the path multiplexing request. Further, unnecessary consumption of the bandwidth among nodes having the path multiplexing function can be decreased.

While the invention has been particularly shown and described with reference to exemplary embodiments, the invention is not limited to these embodiments. It will be understood by those of ordinary skill in the art that various changes in form and details may be made therein without departing from the spirit and scope of the present invention as defined by the claims.

What is claimed is:

1. A communication system comprising first, second, and third nodes interconnected via interconnect links, a primary path composed of an interconnect link between the first node and the third node, and a secondary path composed of an interconnect link between the first and second nodes and an interconnect link between the second and third nodes,
    wherein when the first node and the third node function as a transmitting node and a receiving node respectively, having a path multiplexing function to communicate with each other using bandwidths of a plurality of paths simultaneously, the first node decides whether to transmit a path multiplexing request message based on status information of the primary path, and if the first node decides to transmit the path multiplexing request message, the first node transmits, to the second node, the path multiplexing request message for requesting communication with the third node, and
    when receiving the path multiplexing request message, the second node functions as a relay node and determines whether the primary path and the secondary path can be logically multiplexed by providing, to the first node, the bandwidth of the interconnect link between the second and third nodes, and if path multiplexing is possible, the second node returns a path multiplexing acknowledgement message to the first node,
    the first node, in response to the path multiplexing acknowledgement message, multiplexes the primary and secondary paths to communicate with the third node, and
    the node functioning as the relay node has a function for identifying a source of received data based on the received data, and if the node functioning as transmitting node is identified as the source of the received data, the received data is not multiplexed onto the path via the transmitting node.

2. The communication system according to claim 1, wherein the first node functioning as transmitting node has a load distribution function for transmitting part of all amounts of communication with the third node functioning as receiving node by using the primary path, and transmitting the other part by using the secondary path.

3. The communication system according to claim 1, wherein
    when the third node and the first node function as the transmitting node and the receiving node respectively, the third node transmits to the second node, a path multiplexing request message for requesting communication with the first node,
    when receiving the path multiplexing request message, the second node functions as a relay node and determines whether the primary path and the secondary path can be multiplexed by providing, to the third node, a bandwidth of the interconnect link between the second and third nodes, and if the path multiplexing is possible, the path multiplexing acknowledgement message is returned to the third node, and
    the third node, in response to the path multiplexing acknowledgement message, multiplexes the primary and secondary paths to communicate with the first node.

4. The communication system according to claim 3, wherein the third node functioning as transmitting mode has a load distribution function for transmitting part of all amounts of communication with the first node functioning as receiving node by using the primary path, and transmitting the other part by using the secondary path.

5. The communication system according to claim 3, wherein
    a primary path composed of an interconnect link between the third node and the second node, and a secondary path composed of an interconnect link between the third and first nodes and an interconnect link between the first and second nodes are configured,
    when the third node and the second node function as the transmitting node and the receiving node respectively, the third node transmits to the first node, the path multiplexing request message for requesting communication with the second node,
    when receiving the path multiplexing request message, the first node functions as a relay node and determines whether the primary path, and the secondary path can be logically multiplexed by providing, to the third node, a bandwidth of the interconnect link between the third and second nodes, and if the path multiplexing is possible, the path multiplexing acknowledgement message is returned to the third node, and
    the third node, in response to the path multiplexing acknowledgement message, multiplexes the primary and secondary paths to communicate with the second node.

6. The communication system according to claim 5, wherein the third node functioning as transmitting node has a load distribution function for transmitting part of all amounts of communication with the second node functioning as receiving node by using the primary path, and transmitting the other part by using the secondary path.

7. The communication system according to claim 1, wherein the node functioning as transmitting node decides whether to transmit the path multiplexing request message based on the band occupancy of a traffic rate on the interconnect link with the receiving node.

8. The communication system according to claim 1, wherein the node functioning as transmitting node decides whether to transmit the path multiplexing request message based on the reliability of the interconnect link with the receiving node.

9. The communication system according to claim 4, wherein the path multiplexing acknowledgement message includes path status information and the node functioning as transmitting node decides a ratios of load distribution based on the path status information.

10. The communication system according to claim 1, wherein at least one node of the first to third nodes holding a path multiplexing request corresponding list for indicating plural nodes capable, of receiving the path multiplexing request message, transmits a path multiplexing request message to nodes included in the list.

11. The communication system according to claim 9, wherein when receiving the path multiplexing request message, a node functioning as relay node generates path status information included in the path multiplexing acknowledgement message based on a content or a data amount of traffic dealt with by the relay node.

12. The communication system according to claim 11, wherein the path information indicates whether traffic dealt with by the relay node is multicast traffic or not.

13. The communication system according, to claim 1, wherein a node functioning as relay node includes a path status memory for storing status of a link from the relay node to the receiving node,
when receiving data from the transmitting node after returning the path multiplexing acknowledgement message, the node multiplexes the data onto the link and updates the link status stored based on the amount of data after multiplexing, and
the node determines whether to multiplex subsequent data to the link based on the updated link status, and if it is impossible, the node returns a multiplexing rejection message to the transmitting node.

14. A communication system comprising:
a communication network;
a plurality of relay nodes connected to the communication network;
at least one transmitting node connectable to at least one of the plurality of relay nodes via the communication network; and
a receiving node connected to the plurality of relay nodes, wherein
at least one node in the plurality of relay nodes functions as a transmitting side relay node upon communication between the transmitting node and the receiving node and transmits a path multiplexing request message,
when receiving the path multiplexing request message via the network, at least one other node in the plurality of relay nodes functions as a receiving side relay node that is selected from a node table in which nodes capable of requesting multiplexing are pre-registered as candidates of transmission destination of the path multiplexing request message, with priority of each of the nodes, the transmitting side relay node transmits the path multiplexing request message to at least one of the nodes selected according to the priority in the node table,
at least one primary path and at least one secondary path are configured between the transmitting side relay node and the end node, where a primary path does not include any relay node other than the transmitting side relay node and a secondary path includes the receiving side relay node and the communication network,
it is determined whether at least one primary path and at least one secondary path can be logically multiplexed by providing, to the transmitting node, a bandwidth of a link between the receiving side relay node and the receiving node, and if path multiplexing is possible, a path multiplexing acknowledgement message is returned to the transmitting side relay node via the network,
the transmitting side relay node, in response to the path multiplexing acknowledgement message, relays the communication between the transmitting node and the receiving node using both of at least one of the primary paths, and at least the one secondary path, and
the node functioning as relay node has a function for identifying a source of received data based on the received data, and if the node functioning as the transmitting node is identified as the source of the received data, the received data is not multiplexed onto the path via the transmitting node.

15. The communication system according to claim 14, wherein each relay node holds a path multiplexing request corresponding list for indicating a plurality of relay nodes capable of receiving the path multiplexing request message, transmits the path multiplexing request message to a relay node included in the list.

16. The communication system according to claim 14, wherein a server holding a path multiplexing request corresponding list for indicating a plurality of relay nodes capable of receiving the path multiplexing request message, in response to an inquiry from at least one of the relay nodes transmits the path multiplexing request message to a node included in the list.

17. The communication system according to claim 16, wherein the server is an Application Service Provider (ASP) server.

18. A communication node functioning as any of a transmitting node, a relay node, and a receiving node in a communication network configured of a primary path composed of an interconnect link between the transmitting node and the receiving node, and a secondary path composed of an interconnect link from the transmitting node to the receiving node via the interconnect link, comprising:
a transmitting/receiving unit which performs transmission and reception between the communication node and at least one other node; and
a controller which determines whether to transmit a path multiplexing request message and whether the primary path and the secondary path can be logically multiplexed,
wherein, when the communication node functions as the transmission node, the controller determines whether to transmit a path multiplexing request message based on status information of primary path, and the transmitting/receiving unit sends the path multiplexing request message to the other node functioning as the relay node if the controller decides to transmit the path multiplexing request message for requesting communication with the other node functioning as the receiving node,
wherein, when the node functions as the relay node, the controller determines whether the primary path and the secondary path can be logically multiplexed by providing, to the other node functioning as transmitting node, a bandwidth of an interconnect link between the communication nodes and the other nodes functioning as receiving node on receiving a path multiplexing request message from the other node functioning as the transmitting node via the transmitting/receiving unit,
the node functioning as the relay node has a function for identifying a source of received data based on the received data, and if the node functioning as transmitting node is identified as the source of the received data, the received data is not multiplexed onto the path via the transmitting node,
and wherein the communication node further comprises:
a message generating unit which returns, when the communication node functions as the relay node, a path multiplexing acknowledgement message to the other node functioning as the transmitting node via the transmitting/receiving unit when the path multiplexing is possible as a result of determination by the controller; and a path multiplexing unit which transmits traffic from the other node functioning as the transmitting node to the secondary path, when the communication node functions as the relay node.

19. The communication node according to claim 18, further comprising a path status memory which stores a link status to the other node functioning, as receiving node, wherein when receiving data from the other node functioning as transmitting node via the transmitting/receiving unit after returning the path multiplexing acknowledgement message, the controller controls the path multiplexing unit to multiplex the data onto the link, updates the link status stored based on the amount of data after multiplexing, and determines whether multiplexing of subsequent data onto the link is possible based on the updated link status, and if the controller determines that the multiplexing is impossible, the message generating unit returns a multiplexing rejection message to the other node functioning as transmitting node via the transmitting/receiving unit.

20. The communication node according to claim 18, wherein the path multiplexing request message generated by the message generating unit includes path status information of the interconnect links.

21. The communication node according to claim 18, wherein the controller determines whether the bandwidth of the interconnect link can be provided to the other no, functioning as transmitting node based on the path status information.

22. The communication node according to claim 18, further comprises inverse-multiplexing unit for load distribution of transmission data via the transmitting/receiving unit when the communication node functioning as transmitting node.

23. The communication node according to claim 22, wherein when band occupancy of a traffic rate on a link to the oilier Wade functioning as receiving node is equal to or more than a predetermined value, the path multiplexing request message is transmitted to the other node functioning as relay node on a path connecting the communication node to the other mode functioning as receiving node.

24. The communication node according to claim 23, wherein when the reliability of a link to the other node functioning as receiving node is sufficient, the inverse-multiplexing unit performs load distribution on transmitted data, and when the reliability of the link is insufficient, the data is transmitted to the other node functioning as relay node.

25. A communication method in a communication network configured of a primary path from a transmitting node to a receiving node, and a secondary path from transmitting node to the receiving node via a relay node, the method comprising:
    (a) a step of determining whether to transmit a path multiplexing request message based on status information of primary path;
    (b) a step of transmitting a path multiplexing request message from the transmitting node to the relay node;
    (c) a step of determining whether the primary path and the secondary path can be logically multiplexed by providing, from the relay node to the transmitting node, a bandwidth of an interconnect link between the relay node and the receiving node;
    (d) a step of returning a path multiplexing acknowledgement message to the transmitting node when path multiplexing is possible as a result of the determination; and
    (e) a step of multiplexing the primary path and the secondary path in response to the path multiplexing acknowledgement message, and
    wherein the node functioning as the relay node has a function for identifying a source of received data based on the received data, and if the node functioning as transmitting node is identified as the source of the received data, the received data is not multiplexed onto the path via the transmitting node.

26. The communication method according to claim 25, wherein, in step (c), the status of a link from the relay node to the receiving node is stored in a memory and the stored link status is updated based on the amount of traffic after path multiplexing, and it determined, based on the updated link status, whether subsequent traffic can be transmitted to the link, and
    in step (d), when the result of determination in step (c) is impossible, a path multiplexing rejection message is returned to the transmitting node.

27. The communication method according to claim 25, wherein the path multiplexing request message returned in step (d) includes path status information of the interconnect link.

28. The communication method according to claim 25, wherein, in step (c), it is determined whether a bandwidth of the interconnect link can be provided to the transmitting node based on the path status information.

* * * * *

UNITED STATES PATENT AND TRADEMARK OFFICE
CERTIFICATE OF CORRECTION

| | |
|---|---|
| PATENT NO. | : 8,369,364 B2 |
| APPLICATION NO. | : 12/048448 |
| DATED | : February 5, 2013 |
| INVENTOR(S) | : Tsuneo Nakata |

It is certified that error appears in the above-identified patent and that said Letters Patent is hereby corrected as shown below:

In the Claims
Column 12, Line 3: In Claim 3, delete "transmits" and insert -- transmits, --
Column 12, Line 18: In Claim 4, delete "mode" and insert -- node --
Column 12, Line 32: In Claim 5, delete "transmits" and insert -- transmits, --
Column 12, Line 37: In Claim 5, delete "path," and insert -- path --
Column 13, Line 4: In Claim 10, delete "capable," and insert -- capable --
Column 13, Line 16: In Claim 13, delete "according," and insert -- according --
Column 14, Line 3: In Claim 14, delete "as relay" and insert -- as the relay --
Column 15, Line 10: In Claim 19, delete "functioning," and insert -- functioning --
Column 15, Line 31: In Claim 21, delete "no," and insert -- node --
Column 15, Line 40: In Claim 23, delete "oilier Wade" and insert -- other node --
Column 15, Line 55: In Claim 23, delete "mode" and insert -- node --
Column 16, Line 10: In Claim 25, delete "a path" insert -- the path --
Column 16, Line 33: In Claim 26, after "it" insert -- is --

Signed and Sealed this
Fifth Day of August, 2014

Michelle K. Lee
*Deputy Director of the United States Patent and Trademark Office*